No. 721,733. PATENTED MAR. 3, 1903.
T. H. NANCE.
SEED OR FERTILIZER DRILL.
APPLICATION FILED JAN. 25, 1902.
NO MODEL.

Witnesses
Jas. H. McCathran
B. G. Foster

Turner H. Nance,
Inventor

By E. G. Siggers
Attorney

THE NORRIS PETERS CO., PHOTO-LITHO., WASHINGTON, D. C.

UNITED STATES PATENT OFFICE.

TURNER HUNT NANCE, OF TALLADEGA, ALABAMA, ASSIGNOR TO R. A. WARD, N. M. WEAVER, AND GEORGE McDONALD, OF CUTHBERT, GEORGIA.

SEED OR FERTILIZER DRILL.

SPECIFICATION forming part of Letters Patent No. 721,733, dated March 3, 1903.

Application filed January 25, 1902. Serial No. 91,225. (No model.)

*To all whom it may concern:*

Be it known that I, TURNER HUNT NANCE, a citizen of the United States, residing at Talladega, in the county of Talladega and State of Alabama, have invented a new and useful Seed or Fertilizer Drill, of which the following is a specification.

This invention relates to seed or fertilizer drills; and the object thereof is to provide mechanism of this character which will positively feed seed, grain, and fertilizer to a number of drill-teeth simultaneously, said mechanism being of a simple character that can be constructed at small expense, thereby placing the machine within the reach of agriculturists operating upon a small or large scale.

The preferred construction of the invention is fully illustrated in the accompanying drawings and described in the following specification, though such slight changes may be made as are found desirable provided the changes fall within the scope of the claims hereto appended.

Figure 1:
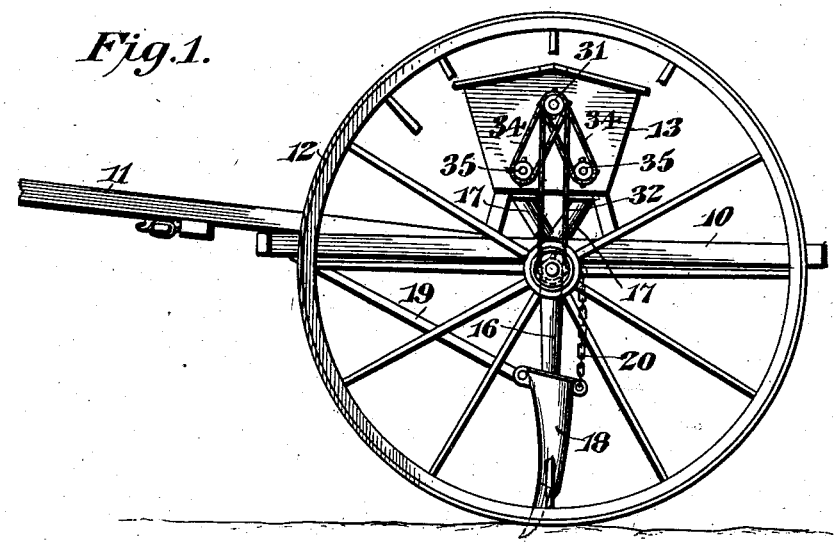
Figure 2:
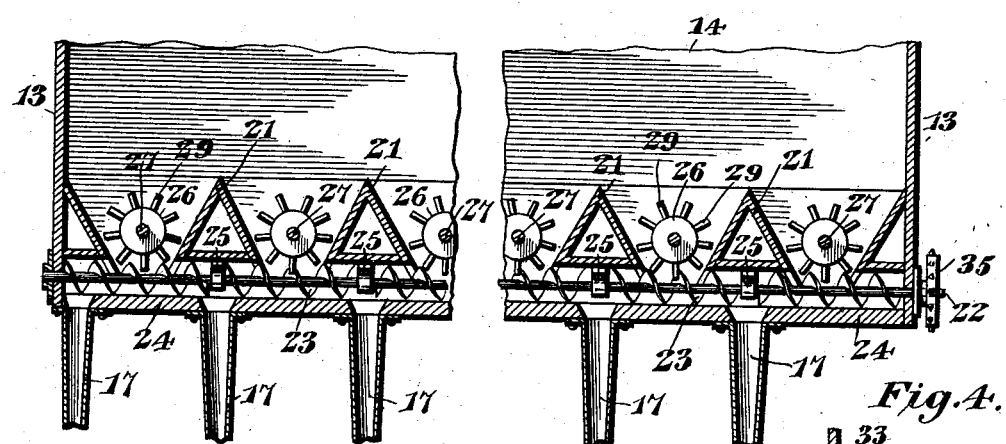
Figures 3, 4:
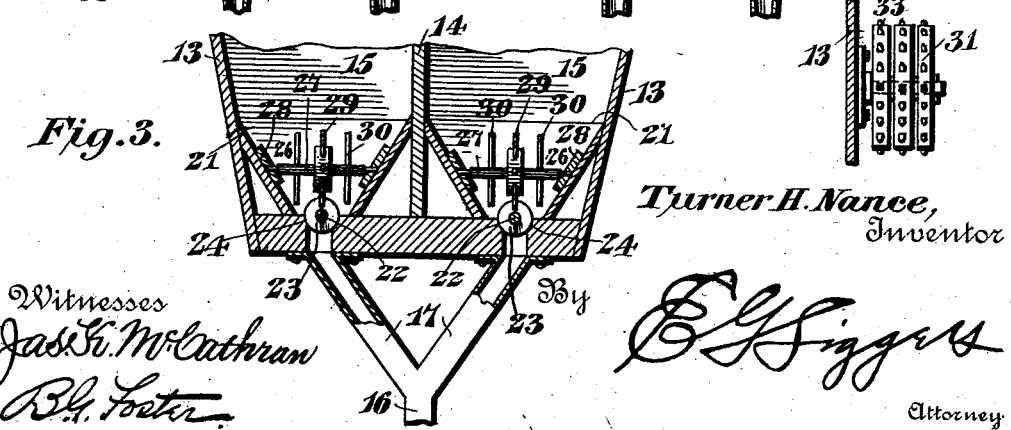

In the drawings, Figure 1 is a side elevation of a seeder constructed in accordance with the present invention. Fig. 2 is a longitudinal sectional view through one of the hoppers or receptacles. Fig. 3 is a vertical transverse section through the machine. Fig. 4 is a detail sectional view through a portion of the driving-gear.

Similar numerals of reference designate corresponding parts in all the figures of the drawings.

As shown in Fig. 1, an ordinary frame 10 is shown, having the usual tongue 11 and supported upon wheels 12, which wheels constitute drivers for the feeding mechanism. Upon the frame between the wheels is supported a receptacle 13, divided by an intermediate longitudinal partition 14 into a pair of hoppers 15. Dropper-tubes 16 are located beneath these hoppers and preferably have their upper ends branched, as shown at 17, said branches being each in communication with one of the hoppers. Instead of this specific arrangement it will be evident that separate tubes may be employed, if desired. The lower ends of the tubes are inserted in the hollow drill-teeth 18, which are pivoted at their upper ends to links 19, the upper rear ends being secured to the usual chains 20. Directly above the inlet ends of the branches 17 are located triangular covers or deflectors 21, the upper inclined faces of which are arranged to direct the material on opposite sides of the inlets. A longitudinally-disposed worm-shaft 22 is journaled along the bottom of each hopper and carries worm-threads 23, which threads fit in semicircular seats 24 made for for the purpose in the bottoms of said hopper. These shafts are preferably supported throughout their lengths by boxings 25, secured to the under sides of the covers 21, and said shafts may be constructed of separate sections, if desired. The worms 23 extend across the spaces between the covers to points over the inlet ends of the branches, so that the material gravitating between said covers will be positively carried to points directly over the inlets, through which it will drop into the tubes, and thence to the ground. In order to prevent the bridging or choking of the spaces between the covers, stirrers 26 are located between the same, said stirrers being constructed and operated in a manner similar to that described in my copending application filed simultaneously herewith, Serial No. 91,224. That application contains claims broad enough to cover the present structure, while no claims are made herein which can be read upon the construction set forth in said other application. As shown, the stirrers each consist of a transverse shaft 27, journaled in suitable boxings 28, secured to the opposite inclined walls of the hopper and carrying an annular series of spike-teeth 29, that mesh with the exposed portion of the worm-thread, whereby said shaft is rotated. The shaft also carries oppositely-projecting stirrer-fingers 30, that are located on opposite sides of the teeth 29.

Any desired gear connection may be made between the wheels 12 of the machine and the worm-shaft 22, though these connections are preferably made as follows: An idler-sprocket 31 is journaled upon the end of the receptacle above the shafts, and a sprocket-chain 32 passes around this idler and about another wheel secured to the shaft or drive-wheel 12. To the idler 31 are detachably secured sprocket-wheels 33, about which pass chains 34, which also pass around other sprocket-wheels 35, secured to the ends of the worm-shaft 22. As a result when the machine is moved in a forwardly direction motion will be transmitted through these several sprocket chains and wheels to the shaft and the worms will be revolved as will also the stirrers. As a result any material placed within the hoppers, whether it be fertilizer or grain, or both, will be positively fed by the worms to the inlet ends of the tubes, and such material will thereupon gravitate down said tubes and into the furrows behind the drill-teeth. Should it be desired to change the speed of the worms, and consequently the amount of material fed through the tubes, it is only necessary to remove the sprocket-wheels 33 and replace them by smaller or larger ones.

It will be seen that this construction is very simple and that the machine may be manufactured at comparative small cost, so that it will be within the reach of large or small farmers. Furthermore, the action of the feeding mechanism is positive and the amount fed can be regulated as desired. While there is illustrated a well-known form of worm, the invention is not to be limited to this specific form, but other kinds well known to the art may be employed, if desired.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

No claim is made herein to the rotatable feed-worm and the rotary stirrer having teeth meshing with the worm and being revolved thereby, as this portion of the construction is fully covered by the aforesaid copending application, Serial No. 91,224.

Having thus described my invention, what I claim as new, and desire to secure by Letters Patent, is—

1. In a seeder, the combination with a receptacle having a bottom, of a plurality of spaced dropper-tubes leading from said bottom, a plurality of spaced triangular covers located over the dropper-tubes, a shaft journaled in the bottom of the receptacle, bearings for said shaft located beneath the covers, and worm-threads secured to the shaft and extending from the spaces between the covers to points over the dropper-tubes.

2. In a seeder, the combination with a receptacle having a bottom provided with discharge-openings, of a plurality of spaced dropper-tubes leading from the openings in the bottom, oppositely-inclined spaced walls located over the adjacent tubes and spaced from the bottom, said walls constituting covers for the discharge-openings, worms extending between the walls and over the adjacent dropper-tubes, and stirrers rotatably mounted between said inclined spaced walls above the worms.

3. In a seeder, the combination with a receptacle having a bottom, of a plurality of spaced dropper-tubes leading from the bottom, oppositely-inclined spaced walls located over adjacent tubes and constituting covers therefor, worms extending from the spaces between the walls to the adjacent dropper-tubes, and stirrers rotatably mounted between said inclined spaced walls, said stirrers being geared to and rotated by the worms.

4. In a seeder, the combination with a receptacle, having a bottom, of a plurality of spaced dropper-tubes leading from the bottom, a plurality of spaced triangular covers located over the dropper-tubes, a worm extending from the space between each pair of covers to a point over each dropper-tube, and stirrers rotatably mounted between the adjacent covers and having teeth that mesh with the worms, whereby said stirrers are rotated.

5. In a seeder, a plurality of receptacles located side by side, dropper-tubes having branches leading from each receptacle, spaced covers located over the inlet ends of the branches, worms extending from the spaces between the covers of the inlets to the branches, and means for simultaneously rotating the worms.

6. In a seeder, the combination with a hopper having a bottom, of dropper-tubes leading from the bottom, spaced covers located over the inlet ends of the tubes, a worm-shaft arranged within the receptacle between the covers and the bottom, and bearings for said shaft disposed beneath the covers.

In testimony that I claim the foregoing as my own I have hereto affixed my signature in the presence of two witnesses.

TURNER HUNT NANCE.

Witnesses:
 JOHN H. SIGGERS,
 FLORENCE E. WALTER.